C. N. BENNETT.
COLOR CINEMATOGRAPHY.
APPLICATION FILED APR. 29, 1913.
1,217,391. Patented Feb. 27, 1917.
2 SHEETS—SHEET 1.
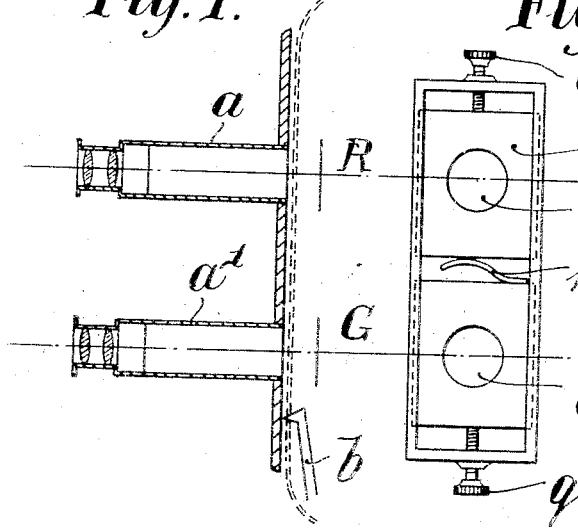

UNITED STATES PATENT OFFICE.

COLIN NOEL BENNETT, OF PENZANCE, ENGLAND.

COLOR CINEMATOGRAPHY.

1,217,391. Specification of Letters Patent. Patented Feb. 27, 1917.

Application filed April 29, 1913. Serial No. 764,306.

*To all whom it may concern:*

Be it known that I, COLIN NOEL BENNETT, of 9 Morrab road, Penzance, Cornwall, England, journalist, have invented certain new and useful Improvements in Color Cinematography, of which the following is a specification.

This invention relates to cinematographic color processes wherein the pictures are taken or projected with the aid of a film-shifting mechanism pitched to two or more times unit pitch, *i. e.* arranged to feed the film forward at each shift a distance equal to two or more times the length or distance of a single picture, in combination with means for taking simultaneously on, or for projecting simultaneously from, each length of film fed forward, two or more different color sensation records of the same movement phase or so-called "part pictures" constituting a set. In such processes two or more negative color sensation records of the same movement phase, or so-called "part pictures" are taken one below another on the film each through its corresponding color filter at each exposure, and in projecting positives prepared from such negatives, a corresponding picture shift is employed, *i. e.* a corresponding length of film is fed forward at each period of travel, and means are provided whereby the corresponding number of color sensation records constituting a set are projected simultaneously by beams of light of the proper colors for the different pictures of a set and are superposed upon the screen.

For the purpose of taking such pictures I have previously proposed to employ a battery or set of lenses and corresponding color filters for taking the different color sensation records forming a set, and I have likewise proposed to employ for this purpose one lens in conjunction with the color filters and with mirrors or other suitable means adapted to reflect or transmit through the lens into positions on the length of film fed by each shift, the two or more color sensation records forming a set.

The present invention aims to provide improvements or modifications in relation to methods and apparatus of the character above referred to.

According to the invention a film-shift is employed arranged to feed the film at each movement a suitable multiple of the length or distance of one picture, and the different color sensation records or "part pictures" of a set are taken simultaneously, but not in consecutive order on the film, the spaces between appertaining pictures of a set being occupied by pictures of other sets.

For two color work, the two color sensation records of a set may be so taken simultaneously that there would be a space corresponding to two picture spaces on the film between them. Calling the spaces lengthwise of the film 1, 2, 3, 4, etc. the pictures on 1 and 4 would then be taken together as a set. Then the next shift of the film would bring spaces 3 and 6 opposite the gate openings of the camera for the next exposure, and give the next set; then at the next shift, spaces 5 and 8 would be exposed, and so on. The gate of the camera would have two apertures in it at correct spacing apart for the purpose.

For three color work the three color sensation records of a set would be taken simultaneously at suitable intervals apart, and the arrangement may for example be such that the picture spaces 1, 2—$n$ etc., lengthwise of the film are exposed in groups of three at a time as follows:— 1, 5, 9; 4, 8, 12; 7, 11, 15; 10, 14, 18; 13, 17, 21; and so on. The gate of the camera would then have three apertures in it suitably spaced apart.

In either case any suitable arrangement is employed to mask those picture spaces on the length of the film fed, which do not correspond to those of the set being taken at the given exposure. A battery of two lenses for two color work or of three lenses for three color work may be employed, the lenses being spaced apart a suitable distance.

Instead of using a battery of two or of three lenses as mentioned, a single lens and mirrors or other suitable means may be employed as above described. An advantage hereinafter described can, however, be obtained by the spacing apart of the lenses of a battery.

Positive films prepared from sets of negative pictures taken on a film in the alternating manner explained will be projected in superimposition on a screen with the aid of corresponding color filters, by means of a projector adapted to project simultaneously, and in superposition, the pictures forming a set, and having a film shift mechanism adapted to feed the film forward, at each movement, a distance equal to the combined length of the pictures forming a set.

Figures 1 to 6 of the accompanying drawings illustrate diagrammatically arrangements for carrying out the present invention. These figures may be taken as illustrative both of the camera for taking the pictures and of the projector for projecting same.

Fig. 1 shows a vertical section through the front of the camera or projector for two color work.

Figure 7:
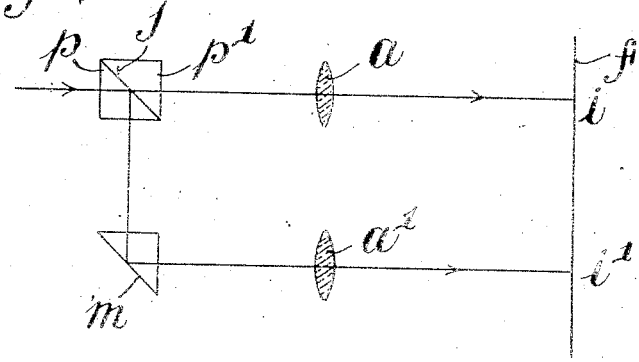
Figs. 7 and 8 show diagrammatically suitable arrangements for overcoming difficulty due to parallax in the taking of the pictures.

Fig. 2 a front elevation of same, and Fig. 3 a corresponding diagram of the film.

Figs. 4, 5 and 6 are corresponding views for three color work.

Figs. 1 and 2 show the two lenses $a$ $a'$ of the camera or projector, these being disposed at such a distance apart, that there is a distance equal to the feed of two picture lengths between the pictures opposite them at a given moment, while $b$ represents the claw of the film-shift mechanism, adapted to feed the film through the gate of the camera or projector, a distance of two picture lengths at each shift. Fig. 3 shows the corresponding film the cross-hatched divisions representing the sections of film which are opposite the lenses of Figs. 1 and 2 and are being exposed or projected together as a pair, R and G represent the two different color filters for the respective lenses. It will be seen that with a camera thus arranged the pictures can be taken in pairs on a film in the order above indicated for two color work and that they can be projected in pairs in superposition by a correspondingly arranged projector.

Fig. 2 shows a *per se* known means of adjusting the distance apart of the lenses by means of a screw $q$ and flat spring $p$, whereby the carrier O of lens $a$ can be moved in grooves in the frame toward or away from the lens $a'$. This adjustment in the case of the camera can serve for adjusting the distance apart of the lenses; in the case of the projector it can serve as known for superposing the simultaneously projected pictures on the screen.

In Fig. 4 $c$ $c'$ $c^2$ represent three lenses disposed at equal distances apart, such that there is a distance corresponding to the feed of three picture lengths between the pictures opposite them at a given moment. The film shift claw $b$ in this case feeds the film three picture lengths at a time, so that the pictures are taken in sets of three on the film (Fig. 6) in the order above indicated for three color work, or are projected in corresponding sets of three pictures simultaneously, R G and B represent the three different color filters for the respective lenses. Fig. 6 shows a similar screw adjustment to that of Fig. 2, applied to the top and bottom lenses $c$ $c^2$, and serving for adjusting the distance apart of the lenses in taking the pictures or for superposing the pictures on the screen in projecting them as the case may be.

The alternating method above described may with advantage be employed for the production of miniature pictures of say half the standard length common in practice. For this purpose there would be employed a picture shift of the standard pitch and an extended gate provided with suitable openings, in conjunction with the necessary color filters and a battery of lenses suitably spaced apart (or a single lens and mirrors or other means as above mentioned) in such manner as to take the miniature pictures in sets of two or three simultaneously at intervals apart as above mentioned. Thus for two color work two half length or miniature color sensation records may be taken simultaneously at the separation of two full size or four half size pictures *i. e.* with a free space equal to the length of two half size pictures between them, and the sequence of the pictures on the film may be as above explained for two color work.

For three color half-length work, a similar arrangement may be adopted, using a film shift three times the length or pitch of a half-length or miniature picture; and the gate may be made of the length of nine miniature pictures and provided with exposure apertures such that the picture spaces can be exposed in groups of three in the sequence above explained for three color work the other picture spaces on the length of film fed for a given exposure being masked. When a battery of three lenses is used they would also be spaced at the proper intervals apart.

In applying the alternating method above described to the taking of color cinematograph pictures of full standard size, with a battery of lenses, the optical axes of the lenses will be spaced apart such a distance as to form the simultaneously taken pictures upon the film at distances apart hereinbefore mentioned for two color work and three color work respectively and the film will be moved two or three times the normal length or distance at each movement, as the case may be.

In these cases also a single lens may be employed with suitable mirrors or other means as before described in taking the pictures, instead of a battery of lenses.

The advantage secured by the wider spacing apart of the lens centers of a battery as employed for taking pictures by the alternating methods described, is that in this way lenses can be employed of larger diameter and having greater rapidity than when the lenses have to cover adjacent spaces. Moreover one is enabled by this method to use lenses spaced apart to a distance amply sufficient to permit of their being accommodated in the usual cylindrical lens mounts, and to allow of using ordinary iris diaphragms in conjunction with the lenses. This again involves the advantage of allowing the lenses to be of wide aperture, a point which is highly necessary in cinematography under varying conditions of illumination. Also such lenses may be of long focus, a point which is likewise usually necessary in cinematography.

I may employ any suitable means for overcoming parallax trouble which may arise with a system of taking two or three pictures with lenses at intervals apart. In particular I may employ any suitable mirror or prismatic system for catching the image and photographing the reflected or refracted image. For example, mirrors may be disposed to reflect the object through the lenses of the battery.

Figure 8:
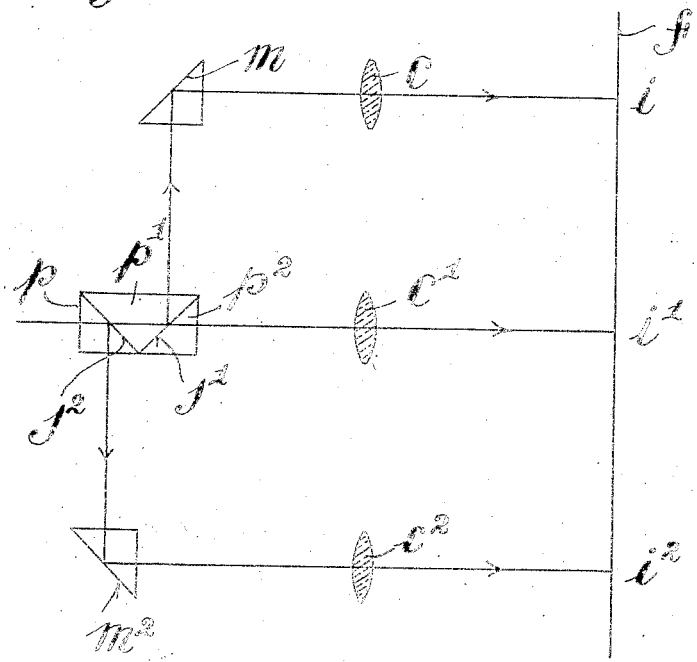

Suitable arrangements for this purpose for two color and for three color work respectively are shown in Figs. 7 and 8.

In Fig. 7, for two color work, there is disposed in front of the lens $a$ a compound prism consisting of two right angle prisms $p\ p'$ with their oblique faces placed together and forming a cube of about the size of the full aperture of the lens, the surface of junction of the prisms $p\ p'$ being at an angle of 45° to the axis of the lens. The junction surface of one of the prisms is coated with a reflecting layer of silver which is partially removed, as for example by lines ruled close together through the silver surface in such manner that the surface is rendered equally semi-transparent over the whole area. Thus the light which passes through the compound prism is divided by the partially reflecting surface into two portions one of which passes directly through the cube and the lens $a$ and forms an image on the film $f$ at $i$ while the other portion of the light is reflected at right angles to the axis of the lens by the said partially reflecting surface $j$ and is then reflected through the second lens $a'$ on to the film $f$ at $i'$ by means of a totally reflecting mirror $m$ arranged parallel to the partially reflecting surface $j$ so as to direct this portion of the light parallel to the first or directly transmitted portion.

In Fig. 8, for three color work a similar arrangement is employed but the compound prism consists of three right angle prisms $p\ p'\ p^2$ with their oblique faces in contact and at 45° to the axis of the middle lens $c'$ outside which the compound lens is placed. The silver coatings of the junction surfaces $j'\ j^2$ of the prisms are ruled closely with lines so as to render them uniformly partially reflecting as mentioned, and the lines on one surface $j'$ are preferably at right angles to those on the other $j^2$.

The light entering the prism is thus divided into three portions, one of which passes directly through the lens $c'$ on to the film at $i'$, another is reflected by the surface $j^2$ on to a mirror $m^2$ parallel to the surface $j^2$ and which directs it through lens $c^2$ on to the film at $i^2$ while the third portion is reflected by the surface $j'$ on to a mirror $m$ which directs it through lens $c$ on to the film at $i$.

It will be understood that positive films prepared from sets of pictures taken in the alternating manner explained in any of its modifications will be projected in superposition on the screen, which can be effected in a manner similar to that hereinbefore described, the projector being adapted to project simultaneously and in superposition, the pictures forming a set, and having a double or treble-pitched film shift for two and three color work respectively. The simultaneously projected pictures will be projected with the aid of correspondingly colored beams of light, intervening pictures of other sets being masked by the opaque portions of the gate of the projector during the projection of the set considered.

The superimposition of the pictures on the screen may be effected by tilting one or more of the lenses in the way usual in biunial or triunial optical projection apparatus, or it may be effected by adjusting the centering of the lenses (without tilting) by an arrangement such as shown in Figs. 2 and 5.

It is obvious that instead of shifting the film vertically in any of the forms of the present invention, it may be shifted horizontally the lenses being suitably arranged to correspond.

It is to be understood that the expression "of same movement phase" as applied to the color sensation records includes not only the simultaneous records of a moving subject, but also those of stationary subjects.

What I claim and desire to secure by Letters Patent is:—

1. Process of color cinematography wherein the color sensation records are taken lengthwise of the film in sets each consisting of a plurality of color sensation records taken simultaneously through color filters, said process comprising taking the different color sensation records of each set simultaneously but not in consecutive order on the film, the spaces between appertaining color sensation records of each set being occupied by color sensation records of other sets of the same picture, and moving the film forward at each shift a predetermined multiple of the distance of one sensation record.

2. Process of three color cinematography wherein the color sensation records are taken lengthwise of the film in sets each consisting of three color sensation records taken simultaneously through color filters, said process comprising taking the three different color sensation records of the respective sets simultaneously on the film in the following order lengthwise of the film, (calling the picture spaces 1, 2, 3—n), set on spaces, 1, 5, 9; set on spaces 4, 8, 12; set on spaces 7, 11, 15; set on spaces 10, 14, 18; set on spaces 13, 17, 21, and so on substantially as described.

3. As a new article of manufacture, a cinematographic film bearing the color sensation records in sets, each consisting of a plurality of different color sensation records of the same movement phase, the records of each set being spaced apart on the film, the spaces between appertaining records of each set being occupied by records of other sets of the same picture, substantially as described.

4. As a new article of manufacture, a positive cinematographic film bearing the color sensation records in sets, each consisting of a plurality of different color sensation records of the same movement phase, the records of each set being spaced apart on the film, and the spaces between appertaining records of each set being occupied by records of other sets of the same picture, substantially as described.

5. As a new article of manufacture cinematographic films bearing color sensation records in sets each consisting of three color sensation records of the same movement phase spaced apart and arranged in sets in the following order lengthwise of the film (calling the picture spaces 1, 2, 3—n) 1, 5, 9; 4, 8, 12; 7, 11, 15; 10, 14, 18; 13, 17, 21 and so on substantially as described.

6. Process of cinematography in colors, comprising simultaneous projection in superimposition on a screen and with colored light beams of positive color sensation records a set at a time, the sets each consisting of a plurality of different color sensation records of the same movement phase spaced apart, the intervening spaces between the pictures of the sets being occupied by the records of each set being occupied by records of other sets, the positive picture film being fed forward at each shift for a corresponding multiple of the distance of one record, and the intervening records of the other sets of the picture being masked during the projection of the set considered, substantially as described.

7. That improvement in the art of color cinematography which consists in simultaneously taking a plurality of color sensation records, the records of each simultaneously taken set being taken at spaced intervals apart on the film, and then filling in similar manner the spaces between appertaining records of a given set with records of another set.

In witness whereof, I have hereunto signed my name in the presence of two subscribing witnesses.

COLIN NOEL BENNETT.

Witnesses:
ALFRED BEESLEY CAMPBELL,
ROBERT M. SHEARPOINT.